(12) United States Patent
Adis et al.

(10) Patent No.: US 7,155,800 B2
(45) Date of Patent: Jan. 2, 2007

(54) AUTOMATED SEAL STRIP ASSEMBLY METHOD AND APPARATUS FOR ROTARY MACHINES

(75) Inventors: William Edward Adis, Scotia, NY (US); Patrick Gill, Holland, PA (US); Michael Mack, Levittown, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/906,558

(22) Filed: Feb. 24, 2005

(65) Prior Publication Data

US 2006/0185166 A1    Aug. 24, 2006

(51) Int. Cl.
*B23P 19/02* (2006.01)

(52) U.S. Cl. .................. 29/522.1; 29/33 Q; 29/38.9; 29/451; 29/235

(58) Field of Classification Search ........... 29/90.7, 29/561, 38.9, 33 Q, 451, 235, 243.58, 889.2, 29/505, 522.1
See application file for complete search history.

(56) References Cited

U.S. PATENT DOCUMENTS

| | | | |
|---|---|---|---|
| 3,284,886 A * | 11/1966 | Provencher | 29/235 |
| 4,747,197 A * | 5/1988 | Charron | 29/235 |
| 5,115,551 A * | 5/1992 | Goedderz et al. | 29/450 |
| 5,237,813 A | 8/1993 | Harris et al. | 60/804 |
| 5,243,747 A * | 9/1993 | Mesnel et al. | 29/243.58 |
| 6,644,667 B1 | 11/2003 | Grondahl | |
| 6,832,428 B1 * | 12/2004 | Miura et al. | 29/450 |
| 6,860,484 B1 | 3/2005 | Urlichs | |
| 6,915,549 B1 * | 7/2005 | Forsberg et al. | 29/278 |
| 2004/0126225 A1 | 7/2004 | Ghasripoor et al. | |
| 2004/0237500 A1 | 12/2004 | Tiemann | |
| 2004/0258480 A1 * | 12/2004 | Prisby | 405/184.4 |

FOREIGN PATENT DOCUMENTS

| | | |
|---|---|---|
| EP | 0896193 A2 | 2/1999 |
| EP | 1160512 A2 | 5/2001 |
| GB | 2258018 A | 7/1991 |
| GB | 1112131 A | 5/1998 |
| GB | 2370617 A | 12/2001 |
| JP | 2001-328036 | * 11/2001 |

OTHER PUBLICATIONS

European Search Report for Application 06251027.6-2301.
European Search Report for Application No. GB0603320.3.

* cited by examiner

*Primary Examiner*—David P. Bryant
*Assistant Examiner*—Christopher M. Koehler
(74) *Attorney, Agent, or Firm*—Cantor Colburn LLP

(57) ABSTRACT

A automated sealing assembly for rotary machines including: a seal guide assembly, the seal guide assembly aligns and holds a caulk wire and a sealing strip in a rotor groove for peening; a peening tool, the peening tool peens said caulk wire to deform the caulk wire and secure the caulk wire and the sealing strip in the rotor groove; an actuator, the actuator controls a movement and preload force of the peening tool producing a rotor groove seal having a predictable pull out strength; and a base for securing the seal guide assembly, the peening tool, and the actuator.

20 Claims, 4 Drawing Sheets

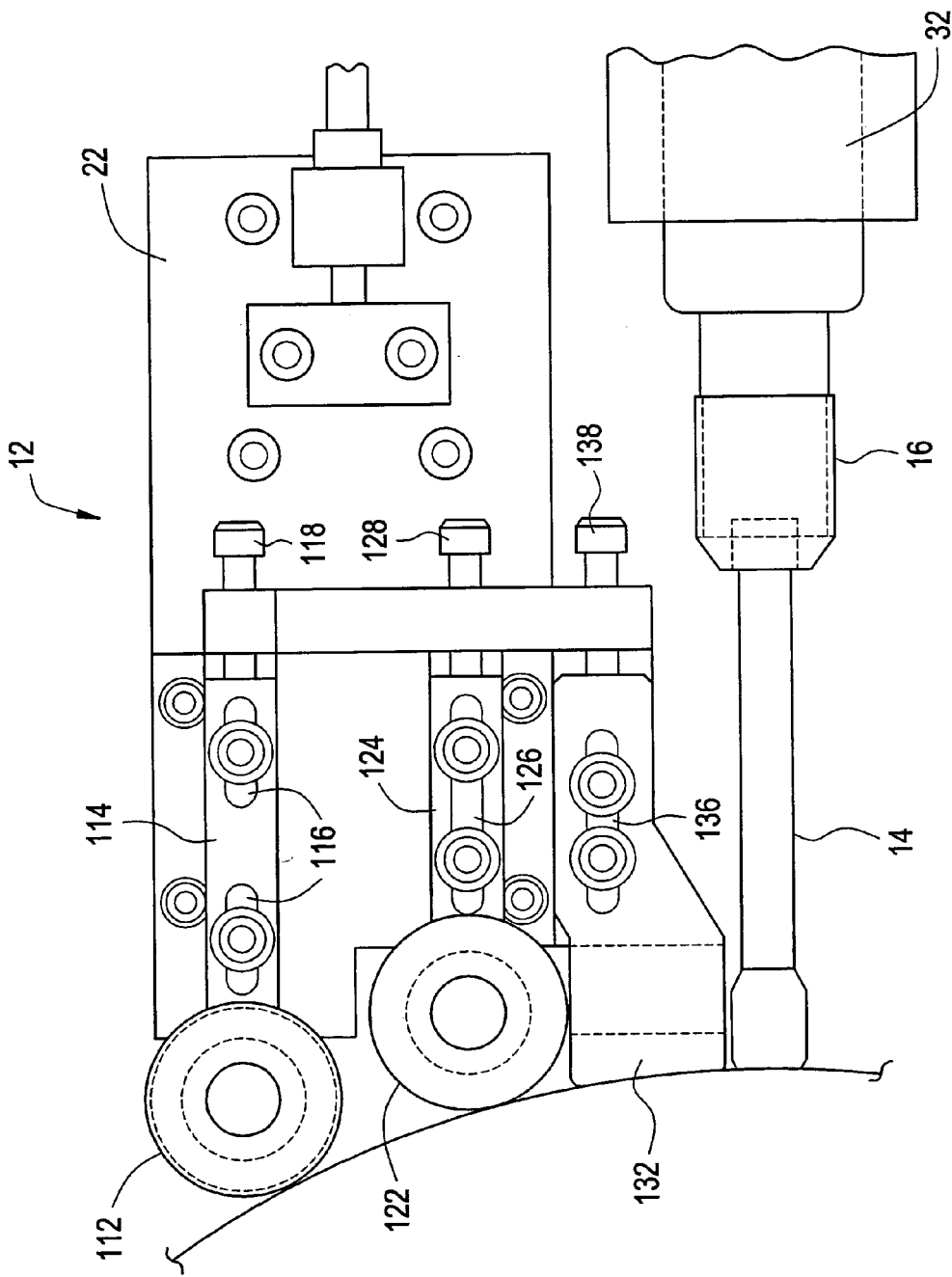

AUTOMATED SEAL STRIP ASSEMBLY METHOD AND APPARATUS FOR ROTARY MACHINES

BACKGROUND OF THE INVENTION

The present invention relates generally to sealing assemblies for rotary machines and, more particularly, to a sealing assembly for a steam or gas turbine.

Rotary machines include, without limitation, steam turbines, compressors, and gas turbines. A steam turbine has a steam path that typically includes, in serial-flow relationship, a steam inlet, a turbine, and a steam outlet. A gas turbine has a gas path, which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas path leakage in the turbine or compressor area of a gas turbine, between the rotor of the turbine or compressor, and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

To reduce gas and steam-path leakage in gas and steam turbine engines, sealing assemblies are used. In various types of turbine sealing assemblies, rotor groove sealing strips are disposed between rotary and stationary components of the turbine engine. Presently, the rotor groove sealing strips are peened using a variety of methods. One method includes, but is not limited to, grinding a curved tip on a hand chisel that is impacted by a hand held hammer to deform or peen wire in a groove. Another method includes grinding a curved tip in a hand held pneumatic vibratory hammer to peen caulk wire into the groove. The current methods of peening the caulk wire, however, do not consistently achieve a high pull out strength of a rotor groove seal created by the peened caulk wire.

Maximizing the pull out strength of the rotor groove seal is important because the rotor groove seal experiences several pullout forces during operation of the turbine. Such forces include, but are not limited to, a centrifugal pull out force, a moment force at the base of the seal due to steam pressures, and radial and tangential forces during metal-to-metal rub, as well as rub against abradable type coatings intentionally applied to a housing defining the steam path. It is therefore desirable to have a rotor groove seal with a predictably high pull out strength.

Additionally, the current methods of peening the caulk wire result in unrepeatable peening such that this peening causes unpredictable seal pull out strengths. The wide variance in seal pull out strengths is due to a variety of factors including, but not limited to, improper positioning of the peening tool by the operator and inconsistent forces applied with the peening tool. For example, the standard deviation of the seal pull out strengths produced by hand peening can be as large as 200 pounds in a population that has a mean seal pull out strength of 600 pounds. The wide variance in seal pull out strength is problematic because low seal pull out strengths can result in seals coming loose during operation and result in significant damage to the turbine including down time of the same.

Accordingly, it would be desirable to develop a cost effective sealing method and apparatus that can produce rotor groove seals having a predictable seal pull out strength, without impairing the performance of the sealing strips.

BRIEF DESCRIPTION OF THE INVENTION

Disclosed herein is an automated sealing assembly for rotary machines including: a seal guide assembly, the seal guide assembly aligns and holds a caulk wire and a sealing strip in a rotor groove for peening; a peening tool, the peening tool peens said caulk wire to deform the caulk wire and secure the caulk wire and the sealing strip in the rotor groove; an actuator, the actuator controls a movement of the peening tool producing a rotor groove seal having a predictable pull out strength; and a base for securing the seal guide assembly, the peening tool, and the actuator.

Also disclosed herein is a method for automated sealing of a rotary machine, the method including: aligning a caulk wire and a sealing strip with a rotor groove; holding the caulk wire and the sealing strip for peening in the rotor groove with a seal guide assembly; peening the caulk wire with a peening tool, movement of the peening tool being controlled by an actuator; moving the peening tool with the actuator; and wherein peening the caulk wire deforms the caulk wire and creates a rotor groove seal with a predictable pull out strength.

Also disclosed herein is a system for automated sealing of a rotary machine, the system including: means for aligning a caulk wire and a sealing strip with a rotor groove; means for holding the caulk wire and the sealing strip for peening in the rotor groove with a seal guide assembly; means for peening said caulk wire with a peening tool, movement of said tool being controlled by an actuator; means for moving the peening tool with the actuator; and wherein said means for peening the caulk wire creates a rotor groove seal with a predictable pull out strength.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a schematic of an exemplary embodiment of a seal guide assembly.

DETAILED DESCRIPTION OF THE INVENTION

Figure 1:
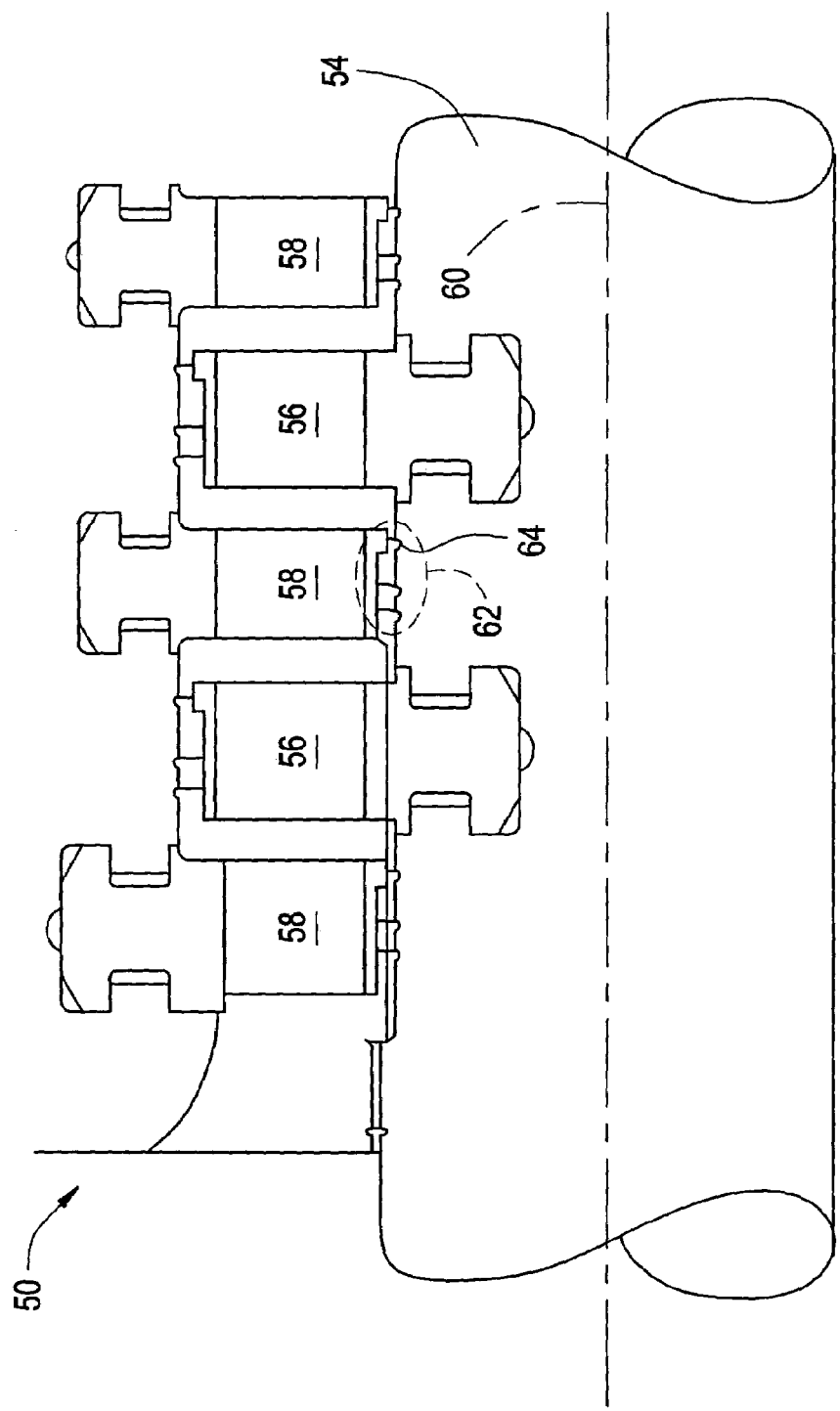
FIG. 1 is a cross-sectional, schematic view of an exemplary rotary machine.

As illustrated in FIG. 1, a typical rotary machine 50 such as a steam turbine (also indicated by reference numeral 50), typically includes at least one rotary component, such as a rotor 54 and rotating buckets 56, and a stationary component 58, such as a stationary steam nozzle (also indicated by reference numeral 58) surrounding the rotor 54. The rotor 54, rotating buckets 56, and the stationary components 58 are disposed circumferentially around a common axis 60. For the rotary machine 50, steam passing through the stationary nozzles 58 is directed at a high velocity against the rotor 54 causing it to rotate at a high speed.

Figure 2:
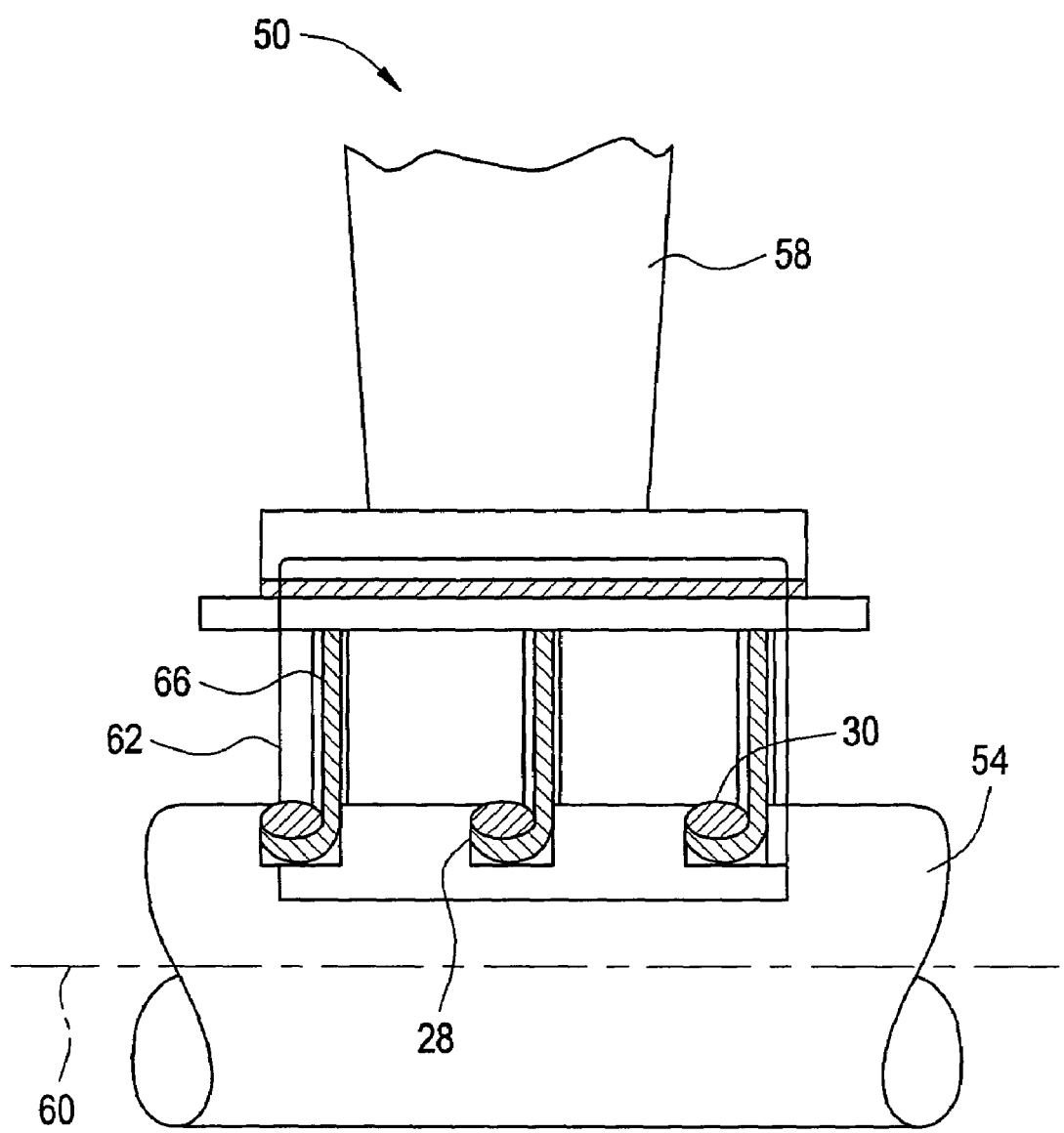
FIG. 2 is an enlarged, detailed view of portion X of FIG. 1 showing an exemplary rotor groove seal.

A rotor groove seal 62 is described first with reference to FIG. 1. As shown, the rotor groove seal 62 is disposed between the rotor 54 and the stationary component 58. Referring also to FIG. 1, the rotor groove seal 62 includes at least one sealing strip 66, which is affixed to either rotor 54 or the stationary component 58. FIGS. 1 and 2 illustrate embodiments of the rotor groove seal 62, for which at least one sealing strip 66 is affixed to the rotor 54. As shown in FIG. 2, a series of sealing strips 66, such as a J strip seal (also indicated by reference numeral 66), may be affixed to the rotor 54, located in a rotor groove 28, by a caulk wire 30.

Figure 3:
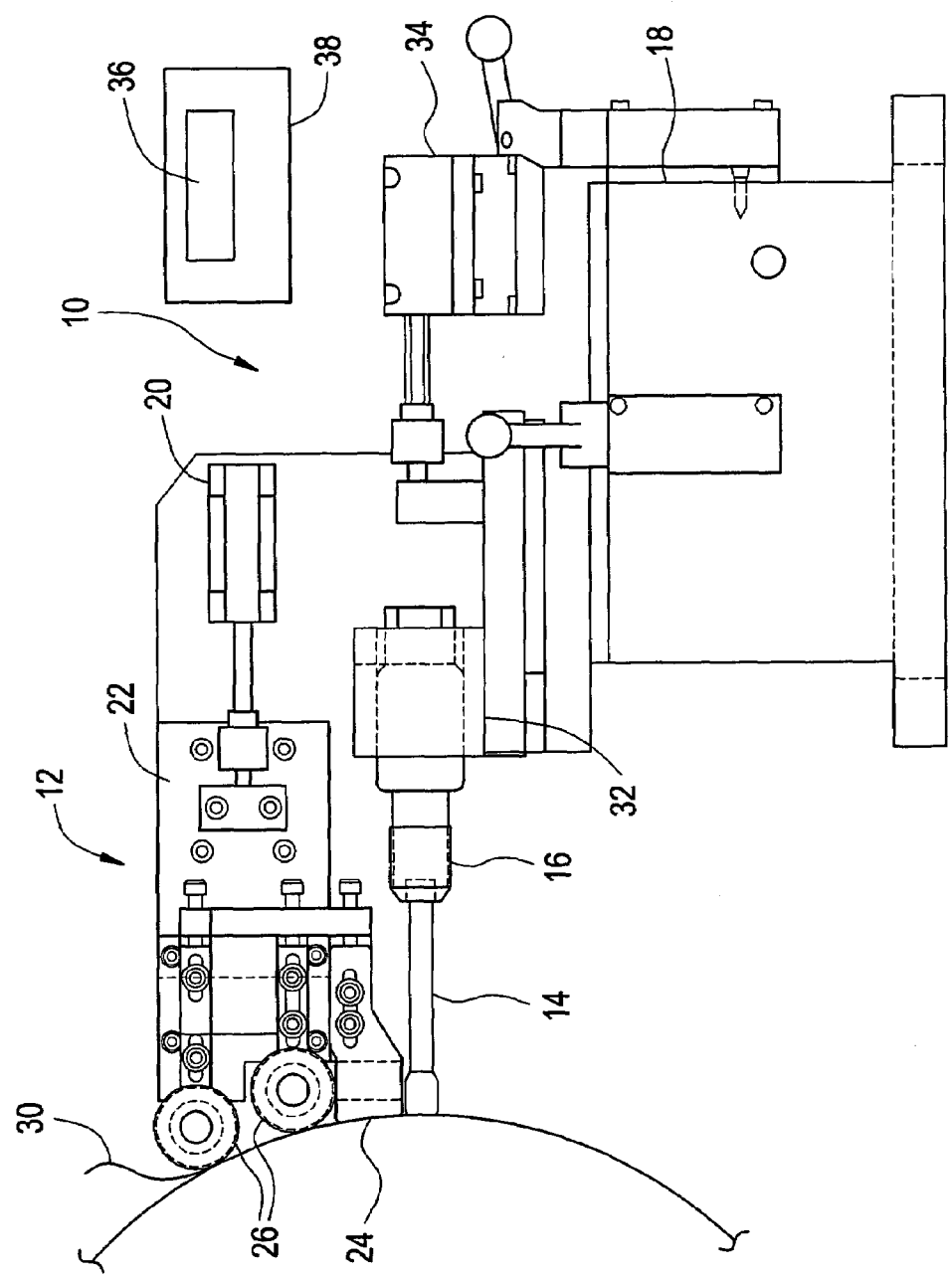
FIG. 3 is a schematic of an exemplary embodiment of an automated sealing assembly.

As illustrated in FIG. 3, an automated sealing assembly 10 is shown which includes a seal guide assembly 12, a peening tool 14, an actuator 16, and a base 18. The seal guide assembly 12 may contain one or more rotary guides 26 and block guides 24. The peening tool 14 may be any tool suitable for peening a caulk wire 30 including, but not limited to, a hammer or a chisel with a radiused tip. The actuator 16 may be a pneumatic, an electric, or a hydraulic actuator. However, any other suitable means known to those of ordinary skill in the art of actuators is envisioned. In an exemplary embodiment, the base 18 is designed to align with the stand of a machining lathe or an assembly lathe to orientate the peening tool 14 with the rotor groove 28.

The seal guide assembly 12 is affixed to a first slide assembly 22, which is affixed to the base 18 such that the seal guide assembly 12 will properly align the caulk wire 30 for peening by the peening tool 14. The seal guide assembly 12 may be positioned such that the seal guide assembly 12 inserts the caulk wire 30 and the sealing strip 66 into the rotor groove 28 before peening. The first actuator 16 is affixed to a second slide assembly 32, which is affixed to the base 18, and the peening tool 14 is affixed to the first actuator 16. The peening tool 14 is oriented to impact the caulk wire 30 while the caulk wire 30 is located inside the rotor groove 28. The peening tool 14 produces a rotor groove seal 62 with a predictable pull out strength by repeatedly striking the caulk wire 30 responsive to the control of the first actuator 16.

In an exemplary embodiment, the first slide assembly 22 controls the force and position of the seal guide assembly 12. The slide assembly 22 is affixed to the base 18 and the seal guide assembly 12 is affixed to the slide assembly 22. The slide assembly 22 allows retraction of the seal guide assembly 12 to facilitate assembly of the caulk wire 30 and the sealing strip 66. In another exemplary embodiment, a second slide assembly 32 controls the position and force of the peening tool 14 and first actuator 16. The second slide assembly 32 is affixed to the base 18 and the first actuator 16 is affixed to the slide assembly 32. The second slide assembly 32 can control the position of the peening tool 14 by controlling the position of the first actuator 16 to which the peening tool 14 is affixed.

In an exemplary embodiment, a second actuator 20 is affixed to the base 18 and connected to the slide assembly 22. The second actuator 20 is used to control the position of and the force exerted by the seal guide assembly 12 relative to the caulk wire 30. In another exemplary embodiment, a third actuator 34 may be affixed to the base 18 and connected to the first actuator 16. Additionally, the third actuator 34 may also be used to control the position of and force exerted by the peening tool 14 relative to the caulk wire 30. The third actuator 34 can control the force exerted by the peening tool 14 by controlling the force exerted by the first actuator 16 to which the peening tool 14 is affixed. Both the second actuator 20 and the third actuator 34 may be a pneumatic, an electric, or a hydraulic actuator. However, any other suitable means known to those of ordinary skill in the art of actuators is envisioned.

The first actuator 16, the second actuator 20, and the third actuator 34 may have a control valve with three modes, forward, reverse, and neutral. The neutral control valve mode allows the operator to manually position the seal guide assembly 12 and the first actuator 16 respectively. In an exemplary embodiment, the first actuator 16, the second actuator 20, and the third actuator 34 may have a neutral mode that can be activated by an emergency stop button located on the automated sealing assembly 10. In an exemplary embodiment, both the second actuator 20 and the third actuator 34 may be pneumatic and the neutral mode vents the pressure of the second actuator 20 and the third actuator 34 to the surrounding atmospheric pressure.

In an exemplary embodiment, the automated sealing assembly 10 is positioned such that the peening tool 14 and the seal guide assembly 12 are properly aligned with a rotor groove 28 such that a caulk wire 30 can be peened. The automated sealing assembly 10 may be aligned for peening using several methods including, but not limited to, a laser guide affixed to the automated sealing assembly 10 which projects a laser to be aligned with the rotor groove 28. The first slide assembly 22 and the second slide assembly 32 are used for adjusting the position of the seal guide assembly 12 and the first actuator 16, respectively. Additionally, the second actuator 20 is used to control the force exerted by the seal guide assembly 12 and third actuator 34 is used to control the force exerted by the peening tool 14, both relative to the caulk wire 30. The seal guide assembly 12 feeds, aligns, and holds the caulk wire 30 for peening by the peening tool 14. The caulk wire 30 is intentionally and repeatably impacted by peening tool 14 during peening, the deformed caulk wire 30 secures the sealing strip 66 in rotor groove 28. The peening tool 14 peens the caulk wire 30 in a manner controlled by the first actuator 16 and the third actuator 34 to produce a rotor groove seal 62 with a predictable seal pull out strength.

In another exemplary embodiment, the peening tool 14 may be a chisel with a hardened tip ground to have a tip thickness, which fits in the rotor groove 28 touching the caulk wire 30 to be peened. The peening tool 14 may have one side that is flat with the body of the peening tool 14 to ride just adjacent to the side of a J seal strip 66. The other side of the peening tool 14 may be blended down to the tip width leaving a tip length to provide clearance for the seal height. To ensure smooth motion of the peening tool 14 on the face of the caulk wire 30 as the peening tool 14 moves along the caulk wire 30 during peening, the width of the tip of the peening tool 14 may be ground to have radiused corners.

Turning now to FIG. 4, the seal guide assembly 12 is shown that may include one or more rotary guides 112, 122. Rotary guides 112, 122 are differentiated by an upper rotary guide 112 that may have a groove on its circumference to accept, hold, and guide the caulk wire 30 and sealing strip 66 for peening. The upper rotary guide 112 is connected to a rectangular block 114 with one or more slotted holes 116 and the position of the upper rotary guide 112 is fine-tuned by a position screw 118. Similarly, the lower rotary guide 122 may be located below the upper rotary guide 112. The lower rotary guide 122 provides more precise positioning of the caulk wire 30 and sealing strip 66 deeper in the rotor groove 28 before peening. The lower rotary guide 122 is connected to a rectangular block 124 with one or more slotted holes 126 and the position of the lower rotary guide 122 is fine-tuned by a position screw 128.

In addition to rotary guides 112, 122, seal guide assembly 12 may include one or more block guides 132. A block guide 132 may be located below the lower rotary guide 122. The block guide 132 may have a face contoured to the rotor 54 to hold the sealing strip 66 and the caulk wire 30 from coming out of the rotor groove 28 during peening. The block guide 132 may be located above the peening tool 14. The block guide 132 contains one or more slotted holes 136. The position of the block guide 132 is fine-tuned by a position screw 138. The fine tuned position of the upper rotary guide 112, the lower rotary guide 122, and the block guide 132 are independent of the position of the other components of the seal guide assembly 12 mounted on the first slide assembly 22. It is noted that the terms "upper" and "lower" are used herein, unless otherwise noted, merely for convenience of description, and are not limited to any one position or spatial orientation.

In an exemplary embodiment, a data logger 38 may be used to monitor and display both pressure and force data measured from the second actuator 20, the third actuator 34, and/or the first actuator 16. The data logger 38 may also have a display 36 that displays the current pressure and force data measured from the second actuator 20, the third actuator 34, and/or the first actuator 16. The data logger 38 optionally may record the pressure and force data onto any suitable means including, but not limited to, a computer readable medium such as a flash memory card or diskette. In an exemplary embodiment, the data logger 38 measures the pressure and force data on time intervals selected by the operator. In another exemplary embodiment, the data logger 38 may be located in a control cabinet that has a slot to accept a computer readable medium. The computer readable medium may be removed from the control cabinet and read by a computer for statistical analysis and production quality records. Optionally, the data logger 38 may have an alert system operable for alerting the operator if a monitored pressure and/or force is outside of a range specified by the operator.

In an exemplary embodiment, the operator is able to precisely control one or more operational parameters of the automated sealing assembly 10. The operational parameters of the automated sealing assembly 10 include, but are not limited to, the angle of the peening tool 14 relative to rotor groove 28, the frequency and magnitude of the movement of peening tool 14, the dwell time of the peening tool 14 on the caulk wire 30 as a function of the rotational speed of the rotor 54, and the force exerted by seal guide assembly 12 and first actuator 16 relative to the caulk wire 30. Optionally, all of the above listed operational parameters may be controlled within specified ranges and a data logger may record the operational parameters for quality control purposes. Furthermore, all of the above listed operational parameters may also be shown to the operator using a suitable display. Such suitable display may include, but is not limited to, an analog gauge or digital display.

Using an automated sealing assembly 10 as disclosed herein it is possible to produce rotor groove seals 62 with a predicable pull out strength. In an exemplary embodiment, rotor groove seals 62 can be made using a 29-mil J seal 66. The rotor groove seal 62 could have a mean pull out strength of approximately 1300 pounds and a standard deviation of approximately sixty-five pounds. The seal pull out strength and standard deviation created using the automated sealing assembly far exceeds the seal pull out strength and standard deviation that are typically achieved through currently available methods, such as hand peening.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A automated sealing assembly for a rotary machine comprising:
   a seal guide assembly, said seal guide assembly feeds, aligns, and holds a caulk wire in a rotor groove for peening;
   a peening tool, said peening tool peens said caulk wire to deform said caulk wire securing said caulk wire in said rotor groove;
   a first actuator, said first actuator controls a movement of said peening tool producing a rotor groove seal having a predictable pull out strength; and
   a base for securing said seal guide assembly, said peening tool, and said first actuator relative to the rotary machine.

2. The automated sealing assembly for a rotary machine of claim 1, wherein said first actuator is at least one of:
   a pneumatic actuator;
   an electric actuator; and
   a hydraulic actuator.

3. The automated sealing assembly for rotary machines of claim 1, wherein said peening tool is a chisel having a radiused tip.

4. The automated sealing assembly for rotary machines of claim 1 further comprising a first slide assembly affixed to said base, said first slide assembly controls a position of said seal guide assembly relative to said rotor groove.

5. The automated sealing assembly for rotary machines of claim 1 further comprising a second slide assembly affixed to said base, said second slide assembly controls a position of said peening tool relative to said rotor groove.

6. The automated sealing assembly for rotary machines of claim 1 further comprising a second actuator, said second actuator controls a force exerted by said seal guide assembly relative to said caulk wire.

7. The automated sealing assembly for rotary machines of claim 6 further comprising a data logger operable for monitoring and recording force exerted by said seal guide assembly relative to said caulk wire.

8. The automated sealing assembly for rotary machines of claim 1 further comprising a third actuator operable for controlling force exerted by said peening tool relative to said caulk wire.

9. The automated sealing assembly for rotary machines of claim 8 further comprising a data logger operable for monitoring and recording force exerted by said peening tool relative to said caulk wire.

10. The automated sealing assembly for rotary machines of claim 1, wherein said seal guide assembly comprises at least one of:
    a rotary guide, said rotary guide aligns said caulk wire; and a block guide, said block guide holds said caulk wire in said rotor groove.

11. A method for automated sealing of a rotary machine, the method comprising:
   aligning a caulk wire with a rotor groove;
   holding said caulk wire for peening in said rotor groove with a seal guide assembly;
   peening said caulk wire with a peening tool, movement of said tool being controlled by a first actuator; and
   peening said caulk wire deforms said caulk wire and creates a rotor groove seal with a predictable pull out strength.

12. The method of claim 11, wherein said first actuator is at least one of the following:
   a pneumatic actuator;
   an electric actuator; and
   a hydraulic actuator.

13. The method of claim 11, wherein said seal guide assembly comprises at least one of:
   a rotary guide, said rotary guide aligns said caulk wire; and
   a block guide, said block guide holds said caulk wire in said rotor groove.

14. The method of claim 11, further comprising:
   controlling a force exerted by said seal guide assembly relative to said caulk wire with a second actuator.

15. The method of claim 14, further comprising:
   recording the force exerted by said seal guide assembly relative to said caulk wire with a data logger.

16. The method of claim 11, further comprising:
   controlling a force exerted by said peening tool relative to said caulk wire with a third actuator.

17. The method of claim 16, further comprising:
   recording the force exerted by said peening tool relative to said caulk wire with a data logger.

18. A system for automated sealing of a rotary machine, the system comprising:
   means for aligning a caulk wire with a rotor groove;
   means for holding said caulk wire before peening said caulk wire in said rotor groove;
   means for peening said caulk wire; and
   means for controlling movement of said peening tool;
   wherein said means for peening said caulk wire creates a rotor groove seal with a predictable pull out strength.

19. The system of claim 18, further comprising means for controlling a force exerted when holding said caulk wire with a second actuator.

20. The system of claim 18, further comprising means for controlling a force exerted when peening said caulk wire.

* * * * *